United States Patent
Kahn et al.

(10) Patent No.: US 7,899,795 B1
(45) Date of Patent: Mar. 1, 2011

(54) METHOD AND SYSTEM FOR RECOVERING LOST DATA VOLUMES

(75) Inventors: Andy C. Kahn, San Francisco, CA (US); George Cabrera, III, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 536 days.

(21) Appl. No.: 11/255,630

(22) Filed: Oct. 21, 2005

Related U.S. Application Data

(60) Provisional application No. 60/676,199, filed on Apr. 28, 2005.

(51) Int. Cl.
*G06F 7/00* (2006.01)
*G06F 17/00* (2006.01)
(52) U.S. Cl. ................................................ 707/690
(58) Field of Classification Search ............ 707/202, 707/205, 206, 690
See application file for complete search history.

(56) References Cited

U.S. PATENT DOCUMENTS

| | | | | |
|---|---|---|---|---|
| 5,590,318 | A * | 12/1996 | Zbikowski et al. | 1/1 |
| 6,173,291 | B1 * | 1/2001 | Jenevein | 707/200 |
| 6,279,011 | B1 * | 8/2001 | Muhlestein | 707/204 |
| 6,738,863 | B2 * | 5/2004 | Butterworth et al. | 711/114 |
| 6,857,001 | B2 | 2/2005 | Hitz et al. | |
| 6,871,295 | B2 * | 3/2005 | Ulrich et al. | 714/6 |
| 6,988,171 | B2 * | 1/2006 | Beardsley et al. | 711/144 |
| 7,243,207 | B1 | 7/2007 | Prakash et al. | |
| 2005/0038803 | A1 | 2/2005 | Edwards | |
| 2006/0179261 | A1 | 8/2006 | Rajan | |

* cited by examiner

*Primary Examiner*—Greta L Robinson
*Assistant Examiner*—Jeffrey Chang
(74) *Attorney, Agent, or Firm*—Blakely, Sokoloff, Taylor & Zafman LLP

(57) ABSTRACT

A system and method are provided to recover lost flexible volumes of an aggregate capable of supporting flexible volumes. The method includes discovering lost flexible volumes of the aggregate and recovering them. Wherein recovering a lost flexible volume includes creating and populating a new label file associated with an container inode.

12 Claims, 7 Drawing Sheets

METHOD AND SYSTEM FOR RECOVERING LOST DATA VOLUMES

This application claims the benefit of Provisional U.S. Patent application No. 60/676,199 filed on Apr. 28, 2005 and entitled, "Method and System for Recovering Lost Data Volumes of Aggregates and Flexible Volumes," which is incorporated herein by reference.

CROSS-REFERENCE TO RELATED APPLICATION

This application is related to the U.S. patent application Ser. No. 11/117,212, entitled, "Method and Apparatus for Offline and Online Consistency Checking of Aggregates and Flexible Volumes," by Andy C. Kahn et al., filed on Apr. 28, 2005, which is incorporated herein by reference.

FIELD OF THE INVENTION

At least one embodiment of the present invention pertains to file systems and, more particularly, to the recovery of volumes of file systems.

BACKGROUND

Certain storage servers known in the art implement an inode based file system to manage stored data. In an inode-based file system, files are stored in two pieces: (1) a chunk of data somewhere in the file system; and (2) an inode, which is a data structure containing information about the location, size, creation/modification/access times, ownership, access attributes of, and links to the file. Data storage is typically implemented as one or more storage "volumes" of physical disks, defining an overall logical arrangement of storage space. The storage devices are typically organized as a disk array, wherein the term "disk" commonly describes a self-contained rotating magnetic media storage device. Storage of information on the disk array may be implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Each volume may be associated with its own file system.

Known storage operating systems typically contain a program to check and repair an associated file system (e.g., a consistency checker or a file system verification program). A file system verification program may be implemented to operate in two phases: an inode phase and a directory phase. In the inode phase, the file system verification program looks at each buffer tree associated with an inode. A "buffer tree" is a linked list of indirect and direct file data blocks, which, in turn, point to file data blocks on the disks that comprise the file system. The file system verification program moves down each buffer tree and verifies that all pointers are valid and that no cross links occur.

In the directory phase, the file system verification program verifies the directory structure stored within the file system. For example, the checking process may first iterate through all of the file inodes of the file system and then through all of the directories of the file system.

A storage system may implement so called flexible volumes, where the file system layout flexibly allocates an underlying physical volume into one or more virtual volumes of a storage system. To that extent, the sizing of flexible volumes is flexible, which avoids the partitioning of storage space and any resulting problems. A flexible volume is a logical volume within an aggregate that may grow or decrease in size. It is only constrained by limits set when it is created and the hard (physical) limits of the aggregate. The underlying physical volume may be an aggregate comprising one or more groups of disks, such as RAID groups.

As flexible volumes are special files in the aggregate, they require a different structure than normal to distinguish them from the other files of the system. For example, each flexible volume may be represented by a file in the aggregate, called a container file, which is hidden and stores all of the blocks used by the associated flexible volume. The aggregate may also include a hidden metadata directory that contains a list of all flexible volumes in the aggregate in a form of subdirectories, e.g.:

WAFL/UUID/filesystem file
/storage label file

Specifically, a "physical" file system (WAFL) directory includes a subdirectory for each flexible volume in the aggregate, with the name of the subdirectory being a universal unique identifier (UUID) of the flexible volume. Each UUID subdirectory contains at least two files, a container file and a storage label file. The storage label file is illustratively a 4 kB file that contains metadata similar to that stored in a RAID label. In other words, the storage label file is the analog of a RAID label and, as such, contains information about the state of the flexible volume such as, e.g., the name of the flexible volume, the UUID and file system identifier (fsid) of the flexible volume, whether it is online, being created or being destroyed, etc.

In order for a system to distinguish between non-container files and container files, each container file in the aggregate is associated with a special type of inode (flexible volume type), designating the file as a container file. As container files are represented differently from non-container files within a file system and also have associated storage label files, in order for a file system verification program to check and repair a system that supports flexible volumes, the program should be able to recognize and handle container files, as well as the associated storage label files, in an appropriate manner. Flexible volumes may become "lost" in the sense that they are no longer accessible to the file system and/or user. These files are usually seen by the file system as file blocks that are of no use to the file system and are deleted. However, these lost flexible volumes may contain desirable information that would be lost if the file was deleted.

SUMMARY

A method is provided to recover lost flexible volumes of an aggregate capable of supporting flexible volumes. The method includes discovering a lost flexible volume container inode of an aggregate and recovering a lost flexible volume associated with the lost flexible volume container inode.

The invention further includes a system that can perform such a method.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A file system verification program may be adapted to check file system consistency on an aggregate that supports flexible volumes by adding operational steps that are specific to container files and storage label files. In one embodiment, the adapted file system verification program compares the flexible volume inodes found on the aggregate against the flexible volume inodes that are listed in the aggregate's metadata directory. If an inconsistency exists it is analyzed and handled as described further below. Once the file system verification program determines whether all of the inodes of flexible volume type are accounted for, the file system may recover those flexible volumes that are deemed recoverable.

Figure 1:
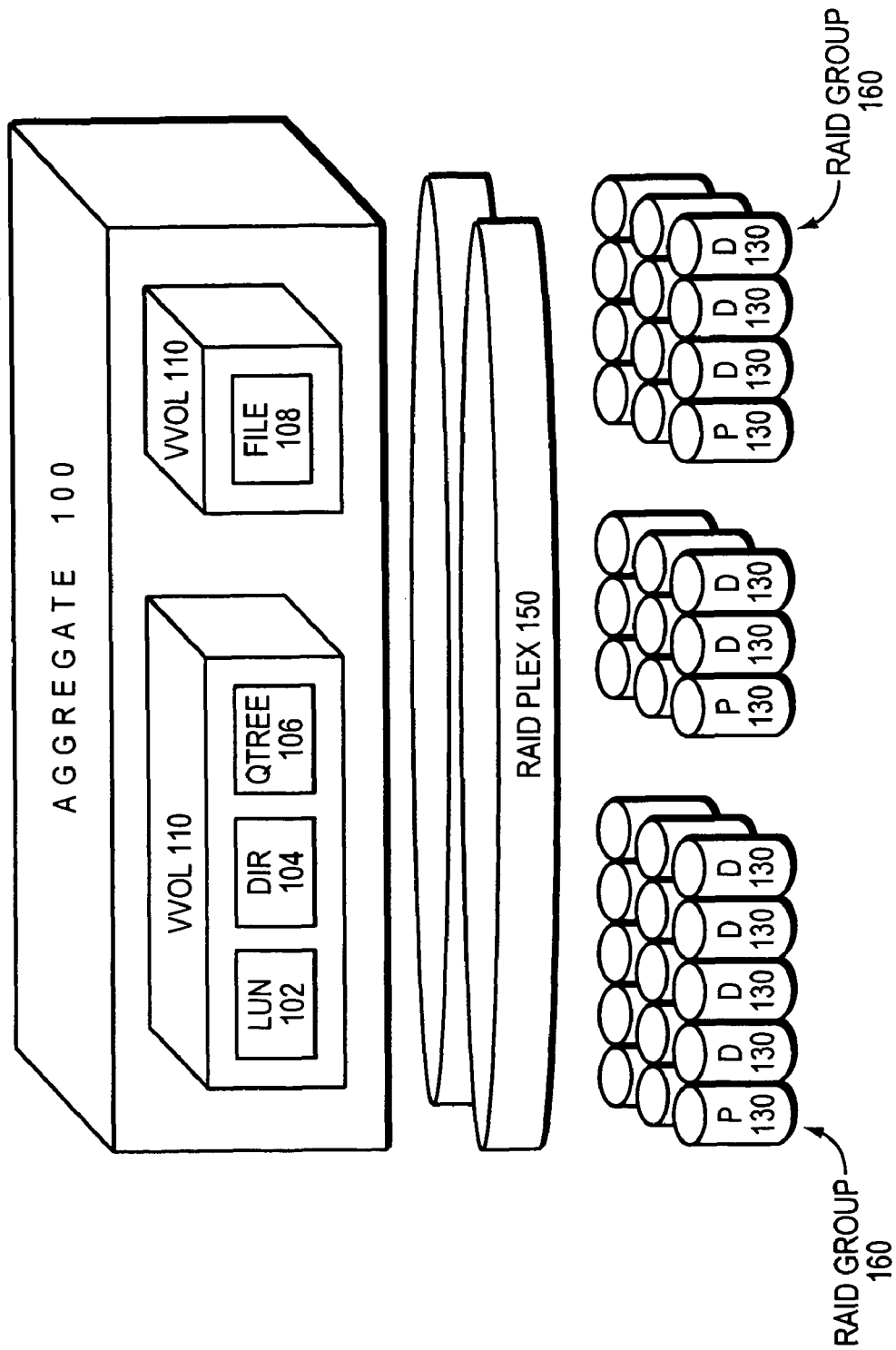
FIG. 1 is a schematic block diagram of an aggregate, according to one embodiment of the present invention.

In one embodiment, the present invention may be described with reference to FIG. 1, illustrating an aggregate 100. The aggregate 100 is the underlying physical volume for a plurality of flexible (or virtual) volumes 110. The aggregate 100 supports a "physical" file system, such as a write anywhere file system (e.g., the Write Anywhere File Layout (WAFL®) file system of Network Appliance, Inc. in Sunnyvale, Calif.), which is transparent to the users. Each flexible volume 110 includes named logical unit numbers (luns) 102, directories 104, qtrees 106, and files 108. A qtree is a special type of directory that acts as a "soft" partition, i.e., the storage used by the qtrees is not limited by space boundaries. The aggregate 100 is illustratively layered on top of the RAID system, which is represented by at least one RAID plex 150 (depending upon whether the storage configuration is mirrored), wherein each plex 150 comprises at least one RAID group 160. Each RAID group further comprises a plurality of disks 130, e.g., one or more data (D) disks and at least one (P) parity disk.

Whereas the aggregate 100 is analogous to a physical volume of a conventional storage system, a flexible volume is analogous to a file within that physical volume. That is, the aggregate 100 may include one or more files, wherein each file contains a flexible volume 110 and wherein the sum of the storage space consumed by flexible volumes associated with the aggregate 100 is physically less than or equal to the size of the overall physical volume. The aggregate 100 utilizes a physical volume block number (pvbn) space that defines the storage space of blocks provided by the disks of the physical volume, while each flexible volume embedded within a file utilizes a "logical" or "virtual" volume block number (vvbn) space in order to organize those blocks as files. Each vvbn space is an independent set of numbers that corresponds to locations within the file, which are then translated to disk block numbers (dbns) on disks. Since the flexible volume 110 is also a logical volume, it has its own block allocation structures (e.g., active, space and summary maps) in its vvbn space.

Each flexible volume 110 may be a separate file system that is "mingled" onto a common set of storage in the aggregate 100 by the associated storage operating system. The RAID system of the associated storage operating system builds a RAID topology structure for the aggregate 100 that guides each file system when performing write allocation. The RAID system also presents a pvbn to disk block number (dbn) mapping to the file system.

Figure 2:
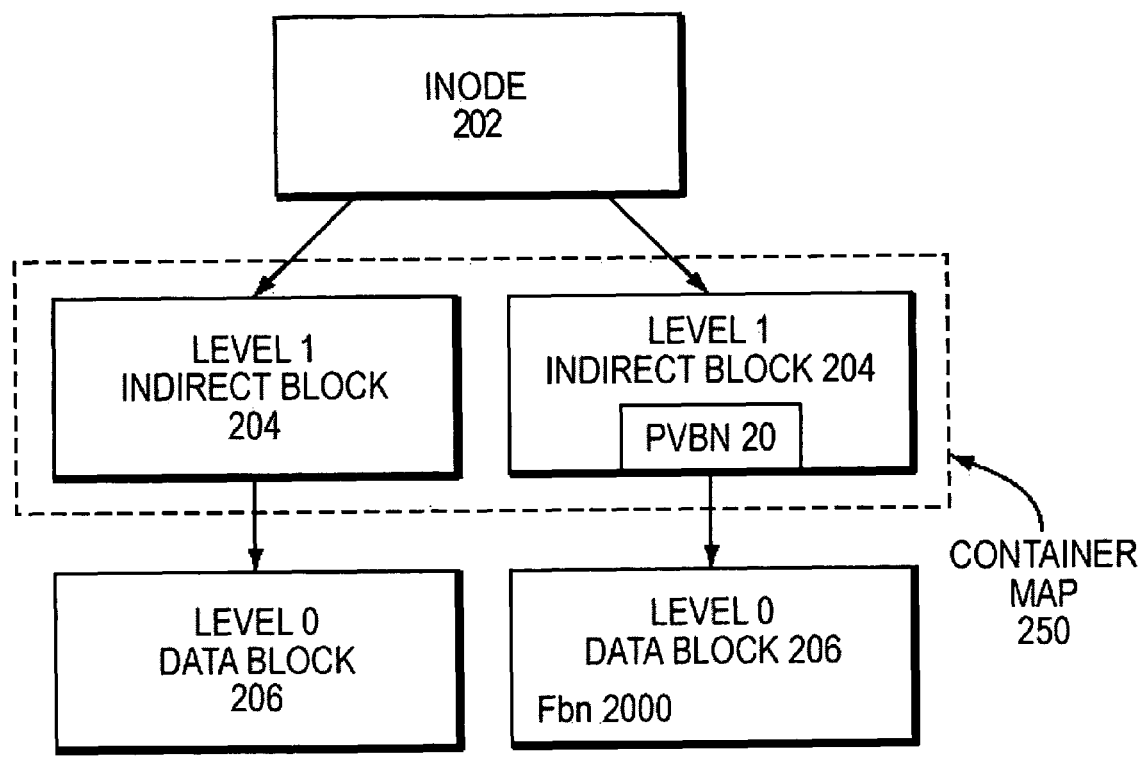
FIG. 2 is a schematic block diagram of a container file, according to one embodiment of the present invention.

FIG. 2 is a schematic block diagram of a container file 200 for a flexible volume 110, in accordance with one embodiment of the present invention. The container file 200 has an inode 202 of the flexible volume type that is assigned an inode number equal to a virtual volume id (vvid). The container file 200 is typically one large, sparse virtual disk and, since it contains all blocks owned by its virtual volume (vvol), a block with virtual volume block number (vvbn) X in the flexible volume 110 can be found at the file block number (fbn) X in the container file 200. For example, vvbn 2000 in the flexible volume 110 can be found at fbn 2000 in its container file 200. Since each flexible volume 110 in the aggregate 100 has its own distinct vvbn space, another container file may have fbn 2000 that is different from fbn 2000 in the illustrative container file 200. The inode 202 references indirect blocks 204, which, in turn, reference both physical data blocks 206 and virtual data blocks 208 at level 0. The indirect blocks of level 1 together may be referred to as a container map 250.

Figure 2A:
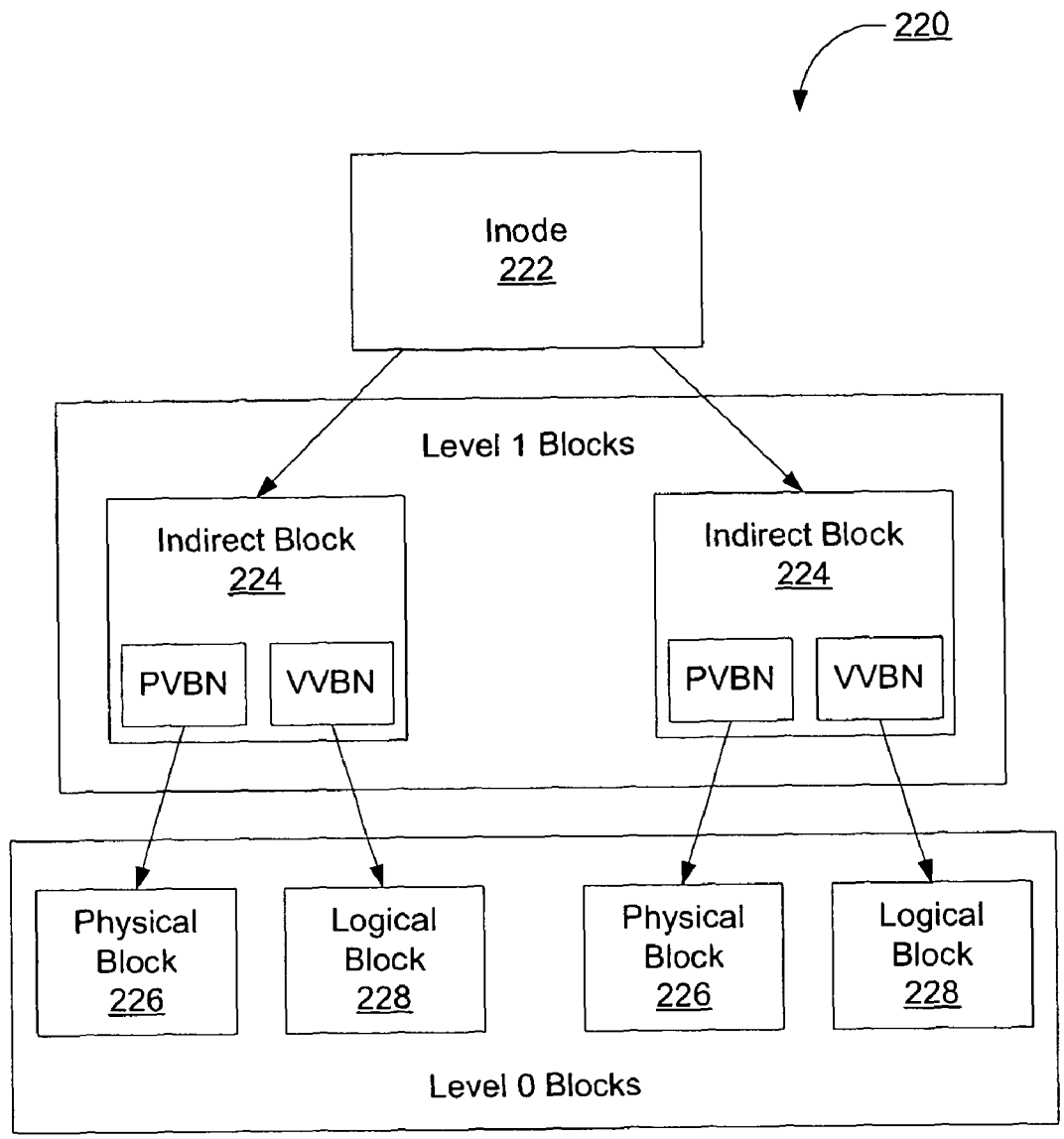
FIG. 2A is a schematic block diagram of a file within a container file, according to one embodiment of the present invention.

FIG. 2A is a schematic block diagram of a file 220 within the container file 200, in accordance with one embodiment of the present invention. The file 220 is assigned an inode 222, which references indirect blocks 224. In a file within a flexible volume, an indirect block stores references to both the physical vbn (pvbn) and a logical (or virtual) vbn (vvbn). The pvbn references a physical block in the aggregate itself and the vvbn references a logical block number in the flexible volume. FIG. 2A shows the indirect blocks 224 referencing both physical data blocks 226 and virtual data blocks 228 at level 0. The file system verification program, in one illustrative embodiment, is configured to check consistency of both the pvbn and the vvbn stored in the indirect block.

Figure 3:
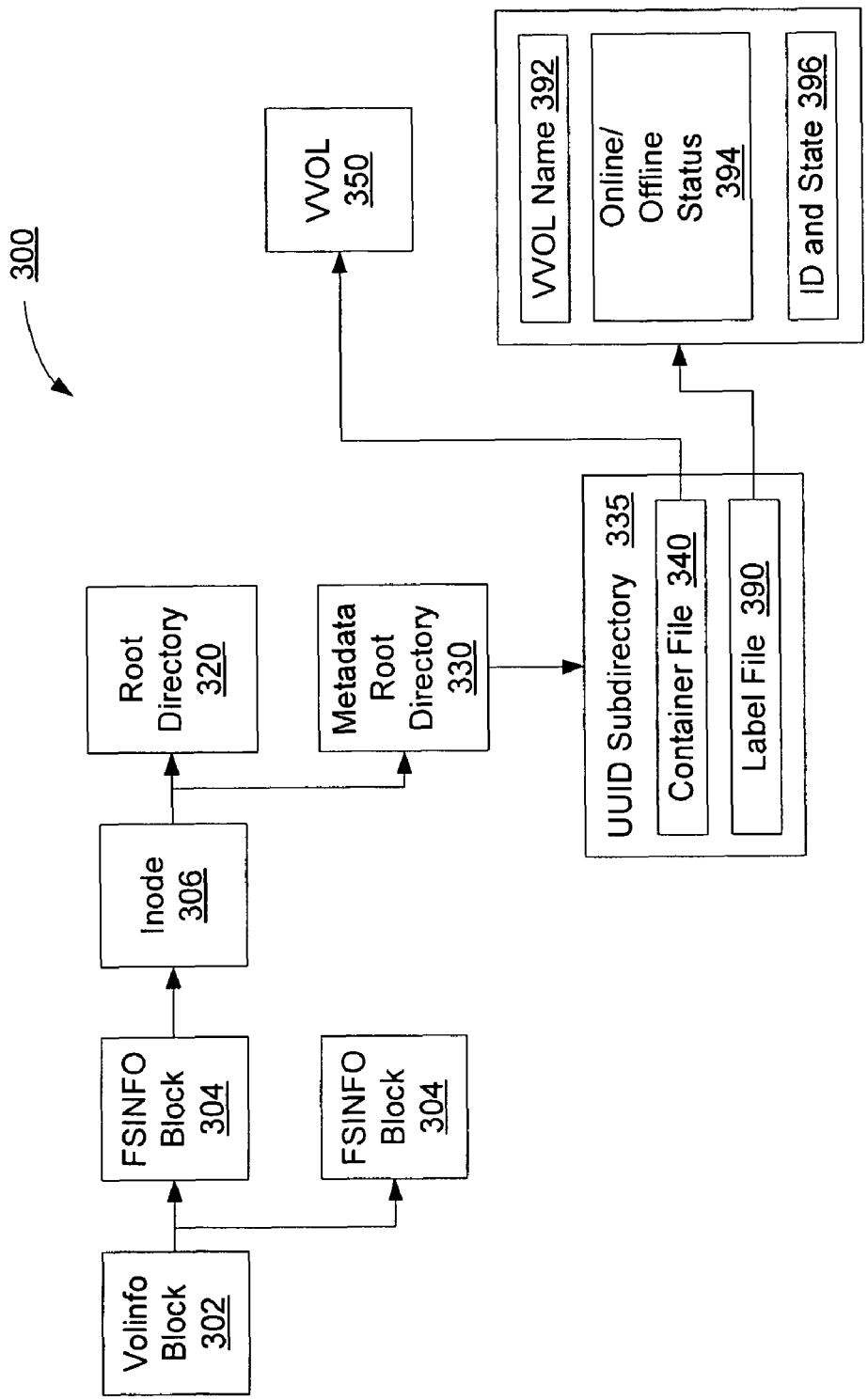
FIG. 3 is a schematic block diagram of an on-disk representation of an aggregate, according to one embodiment of the present invention.

FIG. 3 is a schematic block diagram of an on-disk representation of flexible volumes in the aggregate 100. The RAID system in the storage operating system assembles a physical volume of pvbns to create the aggregate 100. In one embodiment, a volinfo block 302 contains block pointers to fsinfo blocks 304, each of which may represent a snapshot (i.e., an image of the active file system at a point in time, a consistency point (CP)) of the aggregate 100. Each fsinfo block 304 includes a block pointer to an inode file 306 that contains inodes of "flexible volume" type present in the aggregate 100. The inode file 306 has a root directory 320 and a "hidden" metadata directory 330. The metadata directory 330, in turn, includes a directory structure, where each directory is represented by a flexible volume identifier string, UUID subdirectory 335, and includes a container file 340 and a storage label file 390. Unlike a conventional logical volume, where the locations of all files in the volume are organized under the root directory, the root directory 320 in the aggregate 100 is empty. All files related to the aggregate 100 are organized within the hidden metadata directory 330.

As noted earlier, the container file 340 stores all blocks used by the associated flexible volume, here, a flexible volume 350. The storage label file 390 is analogous to a RAID label. A RAID label includes "physical" information about the storage system, such as the volume name. This information is loaded into the storage label file 390. Illustratively, the storage label file 390 includes the name 392 of the associated flexible volume 350, the online/offline status 394 of the flexible volume, and other identity and state information 396.

Figure 4:
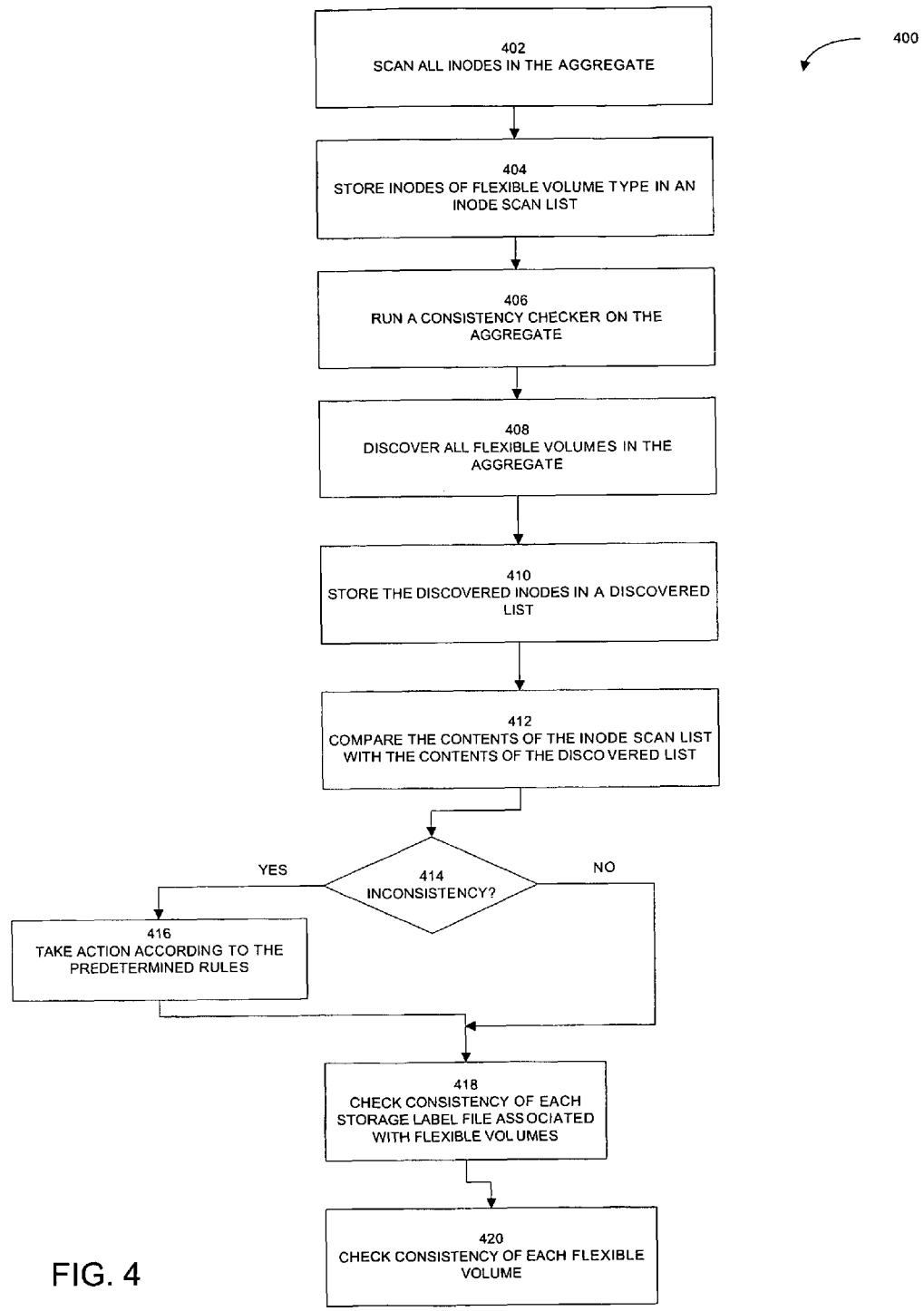
FIG. 4 is a flow chart illustrating a method to check consistency of aggregates and flexible volumes.

In order to check consistency of the aggregate 100 system that supports flexible volumes as illustrated in FIG. 3, a file system verification program may be configured to perform operations as illustrated in FIG. 4. At operation 402, the file system verification program scans all the inodes in the aggregate 100. Every time the file system verification program encounters an inode of the flexible volume type, it stores that inode, at operation 404, in a list (here, termed an "inode scan list"). In an embodiment, the inode scan list is stored in volatile memory. At operation 406, the file system verification program performs a consistency check on the physical file system associated with the aggregate 100 itself. In one embodiment of the present invention, the file system verification program loads the superblock, checks inodes associated with metafiles, checks the metafiles, checks all of the remaining inodes, and checks the directories of the aggregate 100. A superblock stores information related to a mounted file system. It is represented by a file system control block stored on disk (for disk-based file systems).

When the file system verification program encounters a lost file, this lost file is freed automatically, according to one embodiment of the present invention. For example, when checking the consistency of a directory (which is a special file containing directory entries, each entry having an associated file name and the inode number), the file system verification program may determine that one of the directory entries is damaged. If a directory entry is damaged the file system verification program concludes that the associated inode is lost. On the aggregate, because the aggregate's file system is not exported for use by users, the file associated with the lost inode is freed as long as it is not a container file. Alternatively, such lost inodes may be saved for diagnostic and/or recovery purposes.

Similarly, in one embodiment of the present invention, any lost blocks that are identified on an aggregate are always freed (e.g., when the file system verification program determines that an indirect block pointing to the block is corrupted). In an alternative embodiment, such lost blocks may be saved for diagnostic purposes and/or recovery purposes.

Once the consistency check of operation 406 is completed, all flexible volumes in the aggregate 100 are configured (i.e., "discovered") by scanning the aggregate's metadata directory 330 for any flexible volumes. The metadata directory 330 includes one or more directories 335, each of which represents an inode of an associated flexible volume. It will be noted, that, in one embodiment of the present invention, the flexible volumes found in the metadata directory 330 are not brought online at the time of this scanning. The list of flexible volumes generated at operation 408 by scanning the metadata directory 330 may be referred to as a "discovered list." In an embodiment, the discovered list is stored in volatile memory. The entries in the inode scan list are compared with the entries in the discovered list at operation 412. If an inconsistency is discovered in the two lists at operation 414, the file system verification program takes an appropriate action at operation 416, according to predetermined rules.

After the file system verification program compares the inode scan list to the discovered list and ensures that all of the inodes of the flexible volume type are accounted for, it checks consistency, at operation 418, of each one of the storage label files 390 and of each one of the associated flexible volumes 350 at operation 420. In one embodiment, a storage label file 390 is checked for consistency by computing its checksum and comparing this checksum with a predetermined value. If the checksum is not valid and the label file is damaged, the entire RAID file is presumed invalid and the flexible volume associated with the storage label file is deemed lost. In another embodiment, if the storage label file is missing, the flexible volume associated with the storage label is considered lost. For example, the directory in which the container file or storage label is stored is corrupted the storage label would be lost.

When the file system verification program compares the contents of the inode scan list with the contents of the discovered list, the rules described below may apply. If an inode is present in both lists, then the file system verification program checks if a flag indicating that the locations of the files in the volume are organized with the hidden metadata directory 330 (e.g., FLAG_METAFILE) is set. If this flag it is not set, then the file system verification program sets it. If an inode is in the discovered list, but not in the inode scan list, then the file system verification program concludes that the inode is not a flexible volume inode. The file system verification program then changes its type to the flexible volume type, and sets the flag indicating whether the locations of the files in the volume are organized with the hidden metadata directory 330, if this flag is not set already.

If an inode is in the inode scan list, but not in the discovered list, then the file system verification program concludes that this is either data corruption or a lost flexible volume. The file system verification program then sets its type to a regular inode type, clears the flag, and checks if the file block numbers 1 or 2 appear to be valid volinfo blocks. If either of the file block numbers 1 or 2 do appear to be valid volinfo blocks, then it is likely that the file system verification program encountered a lost flexible volume. The file system verification program then saves the inode information associated with the potentially lost volume in order to use it later for possible recovery. In one embodiment, the container inode is moved to a temporary location in the metadata directory for later processing.

A file system verification program also needs to handle flexible volumes that are in the process of being destroyed. Destroying a flexible volume may be described as a two-step process. First, the entire flexible volume UUID subdirectory 335 in the aggregate's metadata directory 330 is renamed/moved to a "recycle bin" directory. The "recycle bin" directory also resides in the metadata directory 330. Second, a recursive remove is done on that flexible volume's UUID subdirectory 335. This technique is provided in order to handle a situation where the system crashes before the container file 340 is removed. When the physical volume is mounted on the next boot cycle, the flexible volume that is partially removed is not being mounted since it is now in the recycle bin which is a directory that is not loaded on boot.

The process of removing a container file from the recycle bin may be lengthy, as the container file is typically quite large. When an inode of the flexible volume type is found in the recycle bin, it is removed from the inode scan list and its blocks are freed in the background.

A collection of those flexible volumes that are found in the recycle bin may be referred to as a "to-be-deleted list." A file system verification program, in one embodiment, may handle flexible volumes that are in the process of being destroyed by performing a discovery phase in order to identify such flexible volumes. The to-be-deleted list can be compared against the inode scan list in a manner similar to what has been described with respect to the discovered list.

In one embodiment of the present invention, the consistency checking of the aggregate 100 is performed offline, where the entire storage system is unavailable for any sort of use by users while the consistency checking is taking place.

Alternatively, the consistency checking may be performed online, where the files and directories comprising the file system are checked at the time when they are first accessed. When an online version of the file system verification program is used, the initial checking of the aggregate 100 is performed while the volumes associated with the aggregate 100 are being mounted (or being made available to the file system consistency checking program). With respect to the checking of the flexible volumes, the discovered list is generated first. The inode scan list is generated incrementally and on-demand. When a flexible volume is loaded for the first time, and the corresponding inode of the flexible volume type is encountered, the file system verification program determines whether the encountered inode is in the discovered list or in the to-be-deleted list and proceeds according to the rules as described with reference to FIG. 4. If the inode is not found in either the discovered list or in the to-be-deleted list, the file system verification program checks if the inode is a lost flexible volume and handles it appropriately.

When the file system verification program is checking flexible volumes within the aggregate 100 at operation 418, those flexible volumes that are offline are made available to the file system verification program. In a case of offline consistency checking, such volumes are not actually mounted or brought online, so their mount, state is unchanged and they stay offline after the consistency check is completed. In a case of the online consistency checking, all volumes are always automatically brought online. If the inode is not found in either the discovered list or in the to-be-deleted list, the file system verification program checks if the inode is a lost flexible volume and handles it appropriately.

The checking of the flexible volumes (e.g., operation 418 of FIG. 4) is similar, in one embodiment of the present invention, to the checking of the aggregate 100. Specifically, the file system verification program loads associated superblocks, checks inodes associated with metafiles, checks the metafiles, checks all of the remaining inodes, and checks the directories. When the file system verification program is checking a flexible volume, any inodes of the flexible volume type that are encountered during the check are made invalid. At operation 420, the file system verification program checks consistency of each one of the storage label files 390 associated with existing flexible volumes. A storage label file 390 may include information indicating that a particular volume is a clone.

A clone is a writable copy of a "parent" virtual volume (vvol) or flexible volume in an aggregate of a storage system. According to one cloning technique, a base snapshot is first provided either by generating a snapshot within the parent (or ancestor) vvol or by choosing an existing snapshot from the parent vvol. A new vvol is then created, along with a new UUID subdirectory in the aggregate and a new storage label file. The new vvol is embodied as a clone and comprises an appropriately sized container file, wherein initially the container file has no data. Moreover, a volume information (volinfo) block for the clone is created that is a slightly modified version of the volinfo block from the base snapshot. The modified volinfo block is written to the container file.

The clone is then instantiated by, e.g., loading a file system associated with the new vvol onto the clone and bringing the clone "online", with only the blocks owned by the clone comprising its modified volinfo block. The file system executes on the clone as it would on a typical vvol, such as the parent vvol. In fact, the file system within the clone resembles the file system within the base snapshot since they comprise substantially the same blocks on disk. The resulting clone is thus a "full-fledged" vvol, i.e., it can service storage (read and write) requests and has its own logical properties, such as snapshot operation functionality. A restriction is that the base snapshot forming the basis of the clone cannot be deleted in the parent vvol while the clone exists. As a result, the cloning technique enables the clone and parent vvol to share on-disk blocks of data in a zero-copy fashion, similar to a snapshot, while also allowing for modifications (unlike the conventional snapshot).

It will be noted that the parent of a clone may also be a clone. For example, assume volume A is a clone of volume B and volume B is a clone of volume C. Volumes B and C are both ancestors of volume A, but only volume B is the parent of volume A. Thus a clone can have a plurality of ancestors (which may be referred to as an ancestry chain), but only one parent. Circular cloning occurs where volume B in this example is also a clone of volume A or where volume C is a clone of volume A. Such circular cloning, where an ancestor of a particular clone is also a clone of the particular clone is not permitted, according to one embodiment of the present invention.

In one illustrative embodiment, a clone may only have one direct parent. The file system verification program may be configured to detect direct children of a given parent and also detect and fix a situation where a clone incorrectly has multiple direct parents.

Circular cloning may be detected, in one embodiment, by counting ancestors of a clone. If the count exceeds, for example, the maximum flexible volumes supported in the system, then it is concluded that there is a loop in the ancestry chain. When the file system verification program encounters a loop in the ancestry chain (i.e., circular cloning), it may select a clone in the chain and modify the settings in the associated storage label file to designate the clone as a non-clone volume according to predetermined rules.

When the file system verification program determines that the subject volume is a clone, it verifies that the parent of the clone is mounted and has already been checked for consistency and, responsive to a negative determination, may attempt to mount the parent volume if it is not mounted and proceed with consistency checking of the parent.

The file system verification program verifies that any block that is in use within the clone is accounted for either in the clone itself or in one of the clone's parents. Specifically, if a block is unique to the clone, then it has to be referenced by the clone's container itself. If a block has not diverged since the time the clone has been created, then the file system verification program verifies if this block can be found in the parent (or in one of the clone's parents if the clone has more than one parent). If the block is not found in the clone or in any of the parents, then the reference to the block within the clone is considered to be invalid and is cleared.

For example, if pvbn 1000 is referenced by an indirect block of a buffer tree of a file that resides in a clone, then a pvbn-to-disk, dbn mapping should exist either in one or some of the block allocation bitmap structures of the clone (e.g., an active map and a summary map) or in one or some of such data structures of the clone's parent. If the file system verification program determines that pvbn 1000 is not in use anywhere, then this inconsistency may be fixed by removing the reference to this block from the indirect block.

Referring again to FIG. 4, consistency of each one of the storage label files 390 associated with existing flexible volumes is checked at operation 420.

It will be noted, that, in one embodiment of the present invention, unrecoverable volumes are offline and inaccessible. In one embodiment of the present invention, a file system verification program can detect the inconsistencies in the storage label file of a clone.

As described earlier, volumes may be considered lost due to a discrepancy between the inode list and discovered list, a lost storage label file, or a damaged label file. For example, the directory in which the volume is associated with could be corrupted and thus the reference to the container file would be lost leading to a lost volume or the label file itself could be corrupted. A volume may also be considered lost if the checksum of the label file fails.

In an embodiment, each container inode contains a link count that associates it with a label. For example, a lost container would have a link count of zero indicating that no labels can be found that are associated with it. This link count also serves as another way to determine if a container is lost. A lost container that is not configurable will have a link count but will be associated with a label file that is corrupted.

The containers for volumes that are considered lost are prepared for recovery upon their discovery. For example, in one embodiment, during consistency checking of the aggregate, the inode is marked such that the container will not be destroyed and the file ID of container inode is saved. In one embodiment, the container inode and/or label file is moved and/or renamed to a temporary location in the aggregate's meta directory. An exemplary temporary location is the recycle bin as described earlier.

Figure 5:
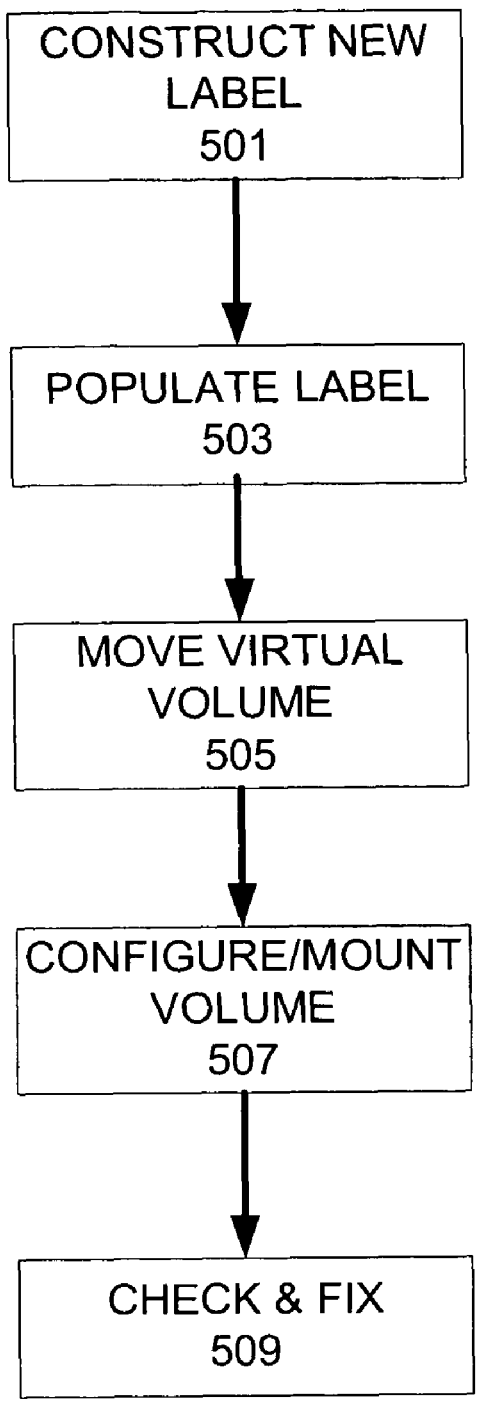
FIG. 5 illustrates a flow chart of an embodiment of lost volume recovery after a lost volume has been located.

FIG. 5 illustrates a flow chart of an embodiment of lost volume recovery after a lost volume has been located. A lost volume will need a new label to be associated with it to be created at 501. This label allows the file system to access the file properly. In one embodiment, recovery may not begin until either the "lost" container inode and/or label file has been prepared for recovery by being moved and/or renamed.

In one embodiment, this label file is similar to the label file that would be created when generating a new volume and is therefore populated in a similar manner at 503. For example, a new name, fsid, and UUID are created for the label. In an embodiment, the label is automatically generated including the naming of the label. Of course it should be understood that the label may later be renamed.

The container file and new label are moved to a new directory and/or sub-directory after the creation of the new label at 505. For example, if the old structure was:

WAFL/OLD_UUID/OLD_filesystem file
/OLD_storage label file the new structure could be:

WAFL/NEW_UUID/OLD_filesystem file
/NEW_storage label file

The container file may be moved to a new directory prior to the creation of a new label. If the directory of the inode is still intact (i.e., not corrupted), the container file will remain in that directory and a new label file will be created. The file structure could be as follows for the old and new flexible volume:

old structure:
WAFL/OLD_UUID/OLD_filesystem file
/OLD_storage label file new structure:
WAFL/OLD_UUID/OLD_filesystem file
/NEW_storage label file Container and label files are accessible by the file system and loaded like normal files including, but not limited to, configuring and mounting them at 507. Once the files have been mounted they are accessible by the file system and may be checked accordingly at 509. For example, a consistency check may be performed on the new files.

If the system crashes before recovery is complete, recovery may be attempted again if the inode has been stored in a temporary location that is not deleted upon a system crash (e.g., if the inode is in the recycle bin). If the container inode has not been moved to a temporary location it may not be recoverable. However, if the consistency check process is re-run it may be able relocate the container inode as before.

Figure 6:
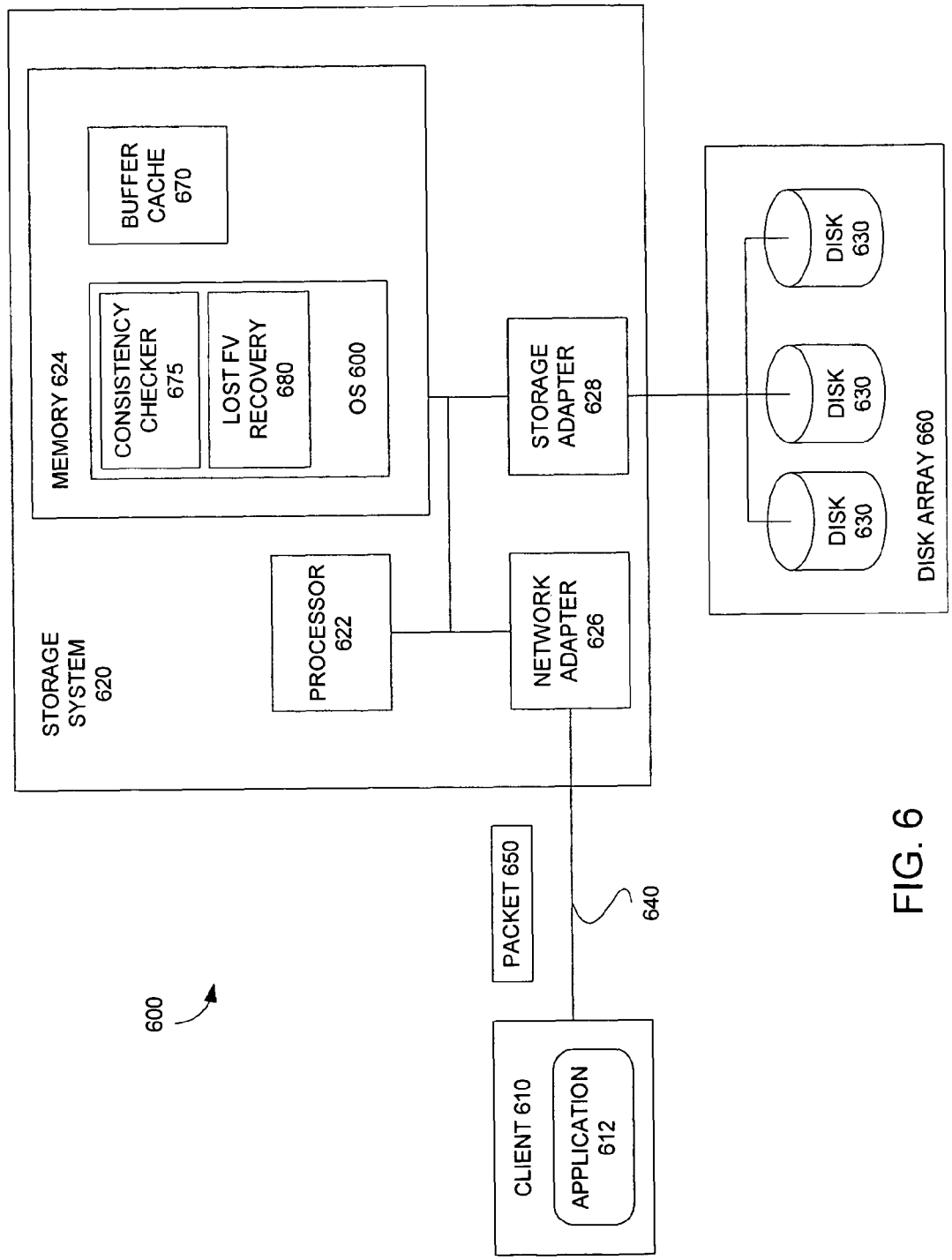
FIG. 6 is a schematic block diagram of an environment including a storage system that may be advantageously used with the present invention.

FIG. 6 is a schematic block diagram of an environment 600 including a storage system 620 that may be advantageously used with the present invention. The storage system is a computer that provides storage services relating to the organization of information on storage devices, such as disks 630 of a disk array 660. The storage system 620 comprises a processor 622, a memory 624, a network adapter 626 and a storage adapter 628 interconnected by a system bus 625. The storage system 620 also includes a storage operating system 600 that preferably implements a high-level module, such as a file system, to logically organize the information as a hierarchical structure of directories, files and special types of files called virtual disks (hereinafter "blocks") on the disks.

In the illustrative embodiment, the memory 624 comprises storage locations that are addressable by the processor and adapters for storing software program code. A portion of the memory may be further organized as a "buffer cache" 670 for storing certain data structures associated with the present invention. The processor and adapters may, in turn, comprise processing elements and/or logic circuitry configured to execute the software code and manipulate the data structures. Storage operating system 600, portions of which are typically resident in memory and executed by the processing elements, functionally organizes the system 620 by, inter alia, invoking storage operations executed by the storage system. For example, the storage operating system may contain modules of a consistency checker 675 and lost flexible volume recovery 680. It will be apparent to those skilled in the art that other processing and memory means, including various computer readable media, may be used for storing and executing program instructions pertaining to the inventive technique described herein. In an embodiment, the storage operating system is the Data ONTAP™ software of Network Appliance, Inc. of Sunnyvale, Calif.

The network adapter 626 comprises the mechanical, electrical and signaling circuitry needed to connect the storage system 620 to a client 610 over a computer network 640, which may comprise a point-to-point connection or a shared medium, such as a local area network. Illustratively, the computer network 640 may be embodied as an Ethernet network or a Fibre Channel (FC) network. The client 610 may communicate with the storage system over network 640 by exchanging discrete frames or packets of data according to pre-defined protocols, such as the Transmission Control Protocol/Internet Protocol (TCP/IP).

The client 610 may be a general-purpose computer configured to execute applications 612. Moreover, the client 610 may interact with the storage system 620 in accordance with a client/server model of information delivery. That is, the client may request the services of the storage system, and the system may return the results of the services requested by the client, by exchanging packets 650 over the network 640. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 628 cooperates with the storage operating system 200 executing on the system 620 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 630, such as HDD and/or DASD, of array 660. The storage adapter includes input/output (I/O) interface circuitry that couples to the disks over an I/O interconnect arrangement, such as a conventional high-performance, FC serial link topology.

Thus, a method and apparatus for offline and online consistency checking of aggregates and flexible volumes have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

It will be noted that the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

What is claimed is:

1. A method comprising:
   discovering a lost flexible volume container inode of an aggregate, wherein discovering comprises identifying the inode as having a flexible volume type by scanning the inode and storing the inode in an inode scan list, scanning a metadata directory for files of a flexible volume type and storing the files of the flexible volume type in the metadata directory in a discovered list and wherein discovering further comprises identifying an inconsistency between the inode scan list and the discovered list; and
   recovering, by a storage server, a lost flexible volume associated with the lost flexible volume container inode of the aggregate, wherein recovering the lost flexible volume comprises generating a new label file associated with the lost flexible volume container inode and populating the new label file, and wherein the new label file comprises a new name of the lost flexible volume, a new universal unique identifier and a new file system identifier, wherein the new label file is different from a previous label file, the new label file is not derived from data identical to that in the lost flexible volume, and the new label file is generated without accessing the lost flexible volume.

2. The method of claim 1, further comprising:
   determining if the inode is in the inode scan list but not the discovered list, and if the inode is not in the discovered list,
   determining if the inode is a container file, wherein if the inode is a container file it is a lost container inode associated with a lost flexible volume.

3. The method of claim 1, further comprising:
   determining if the container inode is in the inode scan list but not the discovered list; and
   performing a checksum on the identified file of flexible volume type, wherein if the checksum fails the container inode is a part of a lost flexible volume.

4. The method of claim 1, further comprising:
   configuring the label file and lost flexible volume container inode.

5. The method of claim 4, further comprising:
   moving the label file and lost flexible volume container inode into a directory of the aggregate.

6. The method of claim 1, further comprising:
   moving the lost flexible volume container inode to a temporary location.

7. A storage system comprising:
   an aggregate configured with one or more groups of mass storage devices;
   one or more flexible volumes associated with the aggregate;
   a consistency checker to check the consistency of the flexible volumes on the aggregate wherein the consistency is configured to discover a lost flexible volume container inode of the aggregate, wherein discovering comprises identifying the inode as having a flexible volume type by scanning the inode and storing the inode in an inode scan list, scanning the metadata directory for files of a flexible volume type and storing the files of the flexible volume type in the metadata directory in a discovered list, and wherein discovering further comprises identifying an inconsistency between the inode scan list and the discovered list; and
   a lost flexible volume recovery module to recover lost flexible volumes of the aggregate, wherein the lost flexible volume recover module is configured to generate a new label file associated with a lost flexible volume container inode, populate the new label file, and move the new label file and the lost flexible volume container inode into a directory of the aggregate, and wherein the new label file comprises a new name of the lost flexible volume, a new universal unique identifier and a new file system identifier, wherein the new label file is different from a previous label file, the new label file is not derived from data identical to that in the lost flexible volume, and the new label file is generated without accessing the lost flexible volume.

8. The lost flexible recovery module of claim 7, further configured to:
   configure the label file and lost flexible volume container.

9. A machine-readable storage medium having stored thereon data representing sets of instructions which, when executed by a machine, cause the machine to perform the operations of:
   determining consistency of a container inode of an aggregate;
   discovering a lost flexible volume container inode of the aggregate, wherein discovering comprises identifying the inode as having a flexible volume type by scanning the inode and storing the inode in an inode scan list, scanning the metadata directory for files of a flexible volume type and storing the files of the flexible volume type in the metadata directory in a discovered list, and wherein discovering further comprises identifying an inconsistency between the inode scan list and the discovered list; and recovering a lost flexible volume associated with the lost flexible volume container inode of the aggregate, wherein recovering the lost flexible volume comprises generating a new label file associated with the lost flexible volume container inode and populating the new label file, and wherein the new label file comprises a new name of the lost flexible volume, a new universal unique identifier and a new file system identifier, wherein the new label file is different from a previous label file, the new label file is not derived from data identical to that in the lost flexible volume, and the new label file is generated without accessing the lost flexible volume.

10. The machine-readable storage medium of claim 9, wherein recovering a lost flexible volume associated with the lost flexible volume container inode of the aggregate further comprises:

moving the label file and lost flexible volume container inode into a directory of the aggregate.

11. The machine-readable storage medium of claim 9, wherein recovering a lost flexible volume associated with the lost flexible volume container inode of the aggregate further comprises:

configuring the label file and lost flexible volume container inode.

12. A method comprising:

scanning, by a storage server, an inode in an aggregate associated with the storage server;

storing an inode identified as having a flexible volume type in an inode scan list;

performing a consistency check on a file system associated with the aggregate;

scanning a metadata directory of the aggregate;

storing a file from the metadata directory representing an inode having a flexible volume type in a discovered list;

comparing the inode scan list to the discovered list;

if an inode is found in the inode scan list but not in the discovered list, determining that the inode is associated with a lost flexible volume; and in response to determining that the inode is associated with a lost flexible volume:

generating a new label file; and populating the new label file with a new name of the lost flexible volume, a new universal unique identifier, and a new file system identifier, wherein the new label file is different from a previous label file, the new label file is not derived from data identical to that in the lost flexible volume, and the new label file is generated without accessing the lost flexible volume.

* * * * *